United States Patent
Proctor, Jr.

(10) Patent No.: US 9,686,790 B2
(45) Date of Patent: *Jun. 20, 2017

(54) SIGNALING FOR WIRELESS COMMUNICATIONS

(71) Applicant: Intel Corporation, Santa Clara, CA (US)

(72) Inventor: James A. Proctor, Jr., Indialantic, FL (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,039

(22) Filed: Feb. 25, 2016

(65) Prior Publication Data

US 2016/0183256 A1 Jun. 23, 2016

Related U.S. Application Data

(63) Continuation of application No. 14/691,568, filed on Apr. 20, 2015, now Pat. No. 9,307,532, which is a
(Continued)

(51) Int. Cl.
*H04W 72/04* (2009.01)
*H04L 1/16* (2006.01)
(Continued)

(52) U.S. Cl.
CPC ......... *H04W 72/0446* (2013.01); *H04L 1/165* (2013.01); *H04L 7/06* (2013.01);
(Continued)

(58) Field of Classification Search
CPC ............. H04W 72/0446; H04W 52/16; H04W 52/325; H04W 52/50; H04W 74/04;
(Continued)

(56) References Cited

U.S. PATENT DOCUMENTS 5,574,984 A 11/1996 Reed et al.
5,862,476 A 1/1999 Hasegawa
(Continued)

FOREIGN PATENT DOCUMENTS

CA 2700343 12/1998
EP 0475698 3/1992
(Continued)

OTHER PUBLICATIONS

Non-Final Office Action for U.S. Appl. No. 13/744,258, dated Jun. 20, 2013, 5 pages.
(Continued)

Primary Examiner — Afsar M Qureshi
(74) Attorney, Agent, or Firm — Blakely, Sokoloff, Taylor & Zafman LLP

(57) ABSTRACT

A communication system, such as a wireless CDMA system, detects markers with fewer errors by having field units transmit the markers at different power levels (e.g., 9 dB for one marker and 11 dB for another marker). The difference in power levels of the markers allows the base station to identify the request markers using alternative criteria with a low probability of error, where the alternative criteria may include comparing the markers to respective energy level thresholds, monitoring occupancy of time slots, occupancy of mutually exclusive code channels, or combinations thereof. For example, in one particular embodiment, a request marker, which is generally a high priority marker, is transmitted with higher power, which improves the probability of detection and reduces the probability of false detection of the request marker.

18 Claims, 6 Drawing Sheets

Related U.S. Application Data continuation of application No. 13/751,608, filed on Jan. 28, 2013, now Pat. No. 9,014,118, which is a continuation of application No. 13/418,517, filed on Mar. 13, 2012, now Pat. No. 8,369,277, which is a continuation of application No. 11/805,013, filed on May 22, 2007, now Pat. No. 8,134,980, which is a continuation of application No. 10/171,080, filed on Jun. 12, 2002, now Pat. No. 7,221,664, and a continuation-in-part of application No. 09/775,305, filed on Feb. 1, 2001, now Pat. No. 7,079,523, said application No. 10/171,080 is a continuation-in-part of application No. 09/997,621, filed on Nov. 29, 2001, now Pat. No. 6,678,260, which is a continuation of application No. 09/730,376, filed on Dec. 5, 2000, now Pat. No. 6,707,804, which is a continuation of application No. 09/088,413, filed on Jun. 1, 1998, now Pat. No. 6,222,832.

(60) Provisional application No. 60/378,697, filed on May 7, 2002, provisional application No. 60/297,925, filed on Jun. 13, 2001, provisional application No. 60/180,598, filed on Feb. 7, 2000.

(51) Int. Cl.

| | | |
|---|---|---|
| *H04L 7/06* | (2006.01) | |
| *H04L 25/14* | (2006.01) | |
| *H04Q 11/04* | (2006.01) | |
| *H04W 52/16* | (2009.01) | |
| *H04W 52/32* | (2009.01) | |
| *H04W 52/50* | (2009.01) | |
| *H04W 74/04* | (2009.01) | |
| *H04L 27/26* | (2006.01) | |
| *H04W 8/00* | (2009.01) | |
| *H04W 28/04* | (2009.01) | |
| *H04W 48/08* | (2009.01) | |
| *H04W 76/04* | (2009.01) | |
| *H04W 84/14* | (2009.01) | |

(52) U.S. Cl.
CPC ......... *H04L 25/14* (2013.01); *H04Q 11/0428* (2013.01); *H04W 52/16* (2013.01); *H04W 52/325* (2013.01); *H04W 52/50* (2013.01); *H04W 74/04* (2013.01); *H04L 27/2601* (2013.01); *H04Q 2213/1327* (2013.01); *H04Q 2213/1336* (2013.01); *H04Q 2213/13098* (2013.01); *H04Q 2213/13202* (2013.01); *H04Q 2213/13204* (2013.01); *H04Q 2213/13209* (2013.01); *H04Q 2213/13216* (2013.01); *H04Q 2213/13298* (2013.01); *H04Q 2213/13332* (2013.01); *H04Q 2213/13389* (2013.01); *H04W 8/005* (2013.01); *H04W 28/04* (2013.01); *H04W 48/08* (2013.01); *H04W 76/048* (2013.01); *H04W 84/14* (2013.01); *Y02B 60/50* (2013.01)

(58) Field of Classification Search
CPC ..... H04W 8/005; H04W 28/04; H04W 48/08; H04W 76/048; H04L 1/165; H04L 7/06; H04L 27/2601; H04Q 11/0428; H04Q 2213/13098; H04Q 2213/13202; H04Q 2213/13204; H04Q 2213/13209; H04Q 2213/13216; H04Q 2213/1327; H04Q 2213/13298; H04Q 2213/13332; H04Q 2213/13336; H04Q 2213/13389; Y02B 60/50

USPC .................................................. 370/252–331
See application file for complete search history.

(56) References Cited

U.S. PATENT DOCUMENTS

| | | | |
|---|---|---|---|
| 5,915,216 A | 6/1999 | Lysejko | |
| 6,222,832 B1 | 4/2001 | Proctor | |
| 6,236,674 B1 | 5/2001 | Morelli et al. | |
| 6,388,999 B1 | 5/2002 | Gorsuch et al. | |
| 6,414,947 B1 * | 7/2002 | Legg | H04J 13/16 370/331 |
| 6,546,252 B1 * | 4/2003 | Jetzek | H04W 36/06 370/332 |
| 6,567,670 B1 * | 5/2003 | Petersson | H04W 36/0083 370/331 |
| 6,678,260 B2 | 1/2004 | Proctor, Jr. | |
| 6,707,804 B2 | 3/2004 | Proctor, Jr. | |
| 7,079,523 B2 | 7/2006 | Nelson, Jr. | |
| 7,221,664 B2 | 5/2007 | Proctor, Jr. | |
| 7,570,929 B1 | 8/2009 | Trompower | |
| 7,903,613 B2 | 3/2011 | Ozluturk et al. | |
| 8,134,980 B2 | 3/2012 | Proctor, Jr. | |
| 8,259,687 B2 | 9/2012 | Foore et al. | |
| 8,369,277 B2 * | 2/2013 | Proctor, Jr. | H04B 1/707 370/252 |
| 9,014,118 B2 * | 4/2015 | Proctor, Jr. | H04L 1/165 370/252 |
| 9,307,532 B2 * | 4/2016 | Proctor, Jr. | H04L 1/165 |
| 2001/0036200 A1 | 11/2001 | Nelson et al. | |
| 2003/0095517 A1 | 5/2003 | Proctor, Jr. | |
| 2004/0252668 A1 | 12/2004 | Ozukturk et al. | |

FOREIGN PATENT DOCUMENTS

| | | |
|---|---|---|
| EP | 0808074 | 11/1997 |
| EP | 0907262 | 4/1999 |
| JP | 2010028832 | 2/2010 |
| JP | 2012110006 | 6/2012 |
| WO | WO-9749201 | 12/1997 |
| WO | WO-9949596 | 9/1999 |
| WO | WO-9963682 | 12/1999 |
| WO | WO-0057663 | 9/2000 |

OTHER PUBLICATIONS

Notice of Allowance for U.S. Appl. No. 13/744,258, dated Nov. 6, 2013, 9 pages.
Office Action for Chinese Application No. 200910132400.7, mailed Aug. 7, 2013, 8 pages.
Non-Final Office Action for U.S. Appl. No. 13/751,608 mailed Aug. 26, 2014, 6 pages.
Notice of Allowance for U.S. Appl. No. 13/418,517 mailed Oct. 2, 2012, 8 pages.
Notice of Allowance for U.S. Appl. No. 11/805,013 mailed Apr. 12, 2010, 8 pages.
Notice of Allowance for U.S. Appl. No. 11/805,013 mailed Jun. 10, 2010, 6 pages.
Notice of Allowance for U.S. Appl. No. 11/805,013 mailed Dec. 13, 2010, 6 pages.
Notice of Allowance for U.S. Appl. No. 11/805,013 mailed Apr. 4, 2011, 8 pages.
Notice of Allowance for U.S. Appl. No. 11/805,013 mailed Aug. 8, 2011, 7 pages.
Notice of Allowance for U.S. Appl. No. 11/805,013 mailed Nov. 18, 2011, 8 pages.
Non-Final Office Action for U.S. Appl. No. 10/171,080 mailed Jun. 26, 2006, 8 pages.
Notice of Allowance for U.S. Appl. No. 10/171,080 mailed Dec. 27, 2006, 6 pages.
Supplemental Notice of Allowability for U.S. Appl. No. 10/171,080 mailed Apr. 17, 2007, 2 pages.
Office Action for Canadian Patent Application No. 2,689,861 mailed Apr. 4, 2013, 2 pages.

(56) References Cited

OTHER PUBLICATIONS

Office Action for Chinese Patent Application No. 200810177521.9 mailed Apr. 14, 2010, 8 pages.
Office Action for Chinese Patent Application No. 200810177521.9 mailed Nov. 5, 2010, 10 pages.
Office Action for Chinese Patent Application No. 200810177521.9 mailed Jul. 6, 2011, 5 pages.
Office Action for Chinese Patent Application No. 200810177521.9 mailed Apr. 28, 2012, 4 pages.
Office Action for Chinese Patent Application No. 200810177521.9 mailed Oct. 31, 2012, 9 pages.
Notice of Allowance for Chinese Patent Application No. 200810177521.9 mailed May 6, 2013, 7 pages.
Office Action for Chinese Application No. 200910132400.7, mailed Dec. 26, 2012, 12 pages.
Notice of Allowance for Chinese Application No. 200910132400.7, mailed Jan. 24, 2014, 7 pages.
Office Action for Chinese Patent Application No. 200910152013.X mailed Mar. 12, 2010, 10 pages.
Office Action for Chinese Patent Application No. 200910152013.X mailed Dec. 7, 2011, 5 pages.
Office Action for Chinese Patent Application No. 200910152013.X mailed Jul. 30, 2014, 9 pages.
European Search Report for European Patent Application No. 02752051.9 mailed Dec. 8, 2009, 3 pages.
Office Action for European Patent Application No. 02752051.9 mailed May 25, 2012, 4 pages.
Notification of Intention to Grant for European Patent Application No. 02752051.9 mailed Mar. 28, 2013, 6 pages.
European Search Report for European Patent Application No. 12164537.8 mailed May 31, 2012, 8 pages.
European Search Report for European Patent Application No. 12164539.4 mailed Jun. 1, 2012, 7 pages.
European Search Report for European Patent Application No. 12164540.2 mailed May 31, 2012, 7 pages.
Final Office Action for Japanese Patent Application No. 2009-245386 mailed Aug. 21, 2012, 7 pages.
Office Action for Japanese Patent Application No. 2012-000485 mailed Aug. 21, 2012, 5 pages.
International Search Report for PCT/US2002/018878 mailed Oct. 3, 2002, 1 page.
International Preliminary Examination Report for PCT/US2002/018878 mailed Aug. 7, 2003, 14 pages.
Notification of Grant for Chinese Patent Application No. 200910152013.X mailed Feb. 4, 2015, 7 pages.
Examiners Report for Canadian Patent Application No. 2,867,406 mailed Mar. 16, 2015, 5 pages.
Notice of Allowance for U.S. Appl. No. 13/751,608 mailed Jan. 5, 2015, 12 pages.
Office Action for Israeli Patent Application No. 205264 mailed Feb. 19, 2015, 3 pages.
Office Action for Application No. 205264 dated Feb. 19, 2015, 3 pages.
Non-Final Office Action for U.S. Appl. No. 14/691,568 mailed Aug. 28, 2015, 7 pages.
Notice of Allowance for Israel Application No. 205264 dated Oct. 19, 2015, 4 pages.
Notice of Allowance for U.S. Appl. No. 14/691,568 mailed Nov. 24, 2015, 8 pages.
Notice of Allowance for Canadian Patent Application No. 2,867,406 mailed Oct. 22, 2015, 1 page.

\* cited by examiner

SIGNALING FOR WIRELESS COMMUNICATIONS

CLAIM OF PRIORITY

This continuation application is related to, and claims priority to, the non-provisional U.S. Utility Patent Application entitled "SIGNALING FOR WIRELESS COMMUNICATIONS," filed Apr. 20, 2015, having an application number of Ser. No. 14/691,568; this continuation application is related to, and claims priority to the non-provisional U.S. Utility Patent Application entitled "SIGNALING FOR WIRELESS COMMUNICATIONS," filed Jan. 28, 2013, having an application number of Ser. No. 13/751,608, which issued as U.S. Pat. No. 9,014,118 on Apr. 21, 2015; this continuation application is related to, and claims priority to the non-provisional U.S. Utility Patent Application entitled "SIGNALING FOR WIRELESS COMMUNICATIONS," filed Mar. 13, 2012, having an application number of Ser. No. 13/418,517, which issued as U.S. Pat. No. 8,369,277 on Feb. 5, 2013; this continuation application is related to, and claims priority to the non-provisional U.S. Utility Patent Application entitled "TRANSMITTAL OF HEARTBEAT SIGNAL AT A LOWER LEVEL THAN HEARTBEAT REQUEST," filed May 22, 2007, having an application number of Ser. No. 11/805,013, which issued as U.S. Pat. No. 8,134,980 on Mar. 13, 2012; this continuation application is related to, and claims priority to the non-provisional Utility Patent Application entitled "TRANSMITTAL OF HEARTBEAT SIGNAL AT A LOWER LEVEL THAN HEARTBEAT REQUEST," filed Jun. 12, 2002, having an application number of Ser. No. 10/171,080, which issued as U.S. Pat. No. 7,221,664 on May 22, 2007; this continuation application is related to, and claims priority to the provisional Utility Patent Application entitled "TRANSMITTAL OF HEARTBEAT SIGNAL AT A LOWER LEVEL THAN HEARTBEAT REQUEST," filed May 7, 2002, having an application number of 60/378,697; and this continuation application is related to, and claims priority to the provisional Utility Patent Application entitled "TRANSMITTAL OF HEARTBEAT SIGNAL AT A LOWER LEVEL THAN HEARTBEAT REQUEST," filed Jun. 13, 2001, having an application number of 60/297,925.

U.S. non-provisional Utility patent application Ser. No. 10/171,080, filed Jun. 12, 2002, which issued as U.S. Pat. No. 7,221,664 on May 22, 2007, is also a continuation-in-part of U.S. non-provisional Utility patent application Ser. No. 09/775,305, filed Feb. 1, 2001, which issued as U.S. Pat. No. 7,079,523 on Jul. 18, 2006, claims the benefit of U.S. provisional Utility Patent Application No. 60/180,598, filed Feb. 7, 2000.

U.S. non-provisional Utility patent application Ser. No. 10/171,080, filed Jun. 12, 2002, which issued as U.S. Pat. No. 7,221,664 on May 22, 2007, is also a continuation-in-part of U.S. non-provisional Utility patent application Ser. No. 09/997,621, filed Nov. 29, 2001, which issued as U.S. Pat. No. 6,678,260 on Jan. 13, 2004, which is a continuation of U.S. non-provisional Utility patent application Ser. No. 09/730,376, filed Dec. 5, 2000, which issued as U.S. Pat. No. 6,707,804 on Mar. 16, 2004, which is a continuation of U.S. non-provisional Utility patent application Ser. No. 09/088,413, filed Jun. 1, 1998, which issued as U.S. Pat. No. 6,222,832 on Apr. 24, 2001.

The entire contents of each of the aforementioned applications is incorporated herein by reference.

BACKGROUND

Increasing use of wireless telephones and personal computers has led to a corresponding increase in demand for advanced telecommunication services that were once thought practical only for specialized applications. In the 1980s, wireless voice communications became widely available through cellular telephone networks. Such services were thought at first to be for the exclusive province of businessmen because of expected high subscriber costs. The same was also true for access to remotely distributed computer networks, whereby until very recently, only business people and large institutions could afford the necessary computers and wireline access equipment.

As a result of the widespread availability of affordable new technologies, the general population now increasingly desires to have not only wireline access to networks such as the Internet and private intranets, but also wireless access as well. Wireless technology is particularly useful to users of portable computers, laptop computers, hand-held personal digital assistants and the like who prefer access to such networks without being tethered to a telephone line.

There still is no widely available satisfactory solution for providing low cost, high speed access to the Internet, private intranets, and other networks using the existing wireless infrastructure. This is most likely an artifact of several unfortunate circumstances. First, the typical manner of providing high speed data service in the business environment over a wireline network is not readily adaptable to the voice grade service available in most homes or offices. For example, such standard high speed data services do not necessarily lend themselves to efficient transmission over standard cellular wireless handsets because wireless networks were originally designed only to provide voice services. As a result, present day digital wireless communications systems are optimized for voice transmissions, although certain schemes such as CDMA do provide some measure of asymmetrical behavior for the accommodation of data transmissions. For example, the data rate specified by the Telecommunication Industry Association (TIA) for IS-95 on the forward traffic channel is adjustable in increments from 1.2 kbps up to 9.6 kbps for so-called Rate Set 1, and increments from 1.8 kbps up to 14.4 kbps for Rate Set 2. On the reverse link traffic channel, however, the data rate is fixed at 4.8 kbps.

At best, existing wireless systems therefore typically provide a radio channel that can accommodate maximum data rate transfers of 14.4 kilobits per second (kbps) over a forward link direction. Such a low data rate channel does not lend itself directly to transmitting data at rates of 28.8 or even 56.6 kbps that are now commonly available using inexpensive wireline modems, not to mention even higher rates such as the 128 kbps that are available with Integrated Services Digital Network (ISDN) type equipment. Data rates at these levels are rapidly becoming the minimum acceptable rates for activities such as browsing web pages.

Although wireline networks were known at the time when cellular systems were initially developed, for the most part, there was no provision made for such wireless systems to provide higher speed ISDN- or ADSL-grade data services over cellular network topologies.

In most wireless systems, there are many more potential users than radio channel resources. Some type of demand-based multiple access system is therefore required.

Whether the multiple access is provided by the traditional Frequency Division Multiple Access (FDMA) using analog modulation on a group of radio frequency carrier signals, or by schemes that permit sharing of a radio carrier frequency using Time Division Multiple Access (TDMA), or Code Division Multiple Access (CDMA), the nature of the radio spectrum is such that it is expected to be shared. This is quite dissimilar to the traditional environment supporting data transmissions in which the wireline medium is relatively inexpensive and is not typically intended to be shared.

Other factors to consider in the design of a wireless system are the characteristics of the data itself. For example, consider that access to web pages generally is burst-oriented, with asymmetrical data rate transmission requirements in a reverse and forward direction. In a common application, a user of a remote client computer first specifies the address of a web page to a browser program. The browser program then sends the web page address data, which is usually 100 bytes or less in length, over the network to a server computer. The server computer then responds with the content of the requested web page, which may include anywhere from 10 kilobytes to several megabytes of text, image, audio, or even video data. The user thereafter may spend several seconds or even several minutes reading the content of the page before downloading another web page.

In an office environment, the nature of most employees' computer work habits is typically to check a few web pages and then to do something else for an extended period of time, such as accessing locally stored data or even terminating use of the computer altogether. Therefore, even though such users may remain connected to the Internet or private intranet continuously during an entire day, actual use of the high speed data link is usually quite sporadic.

If wireless data transfer services supporting Internet connectivity are to coexist with wireless voice communication, it is becoming increasingly important to optimize the use of available resources in wireless CDMA systems. Frequency re-use and dynamic traffic channel allocation address some aspects of increasing the efficiency of high performance wireless CDMA communication systems, but there is still a need for more efficient utilization of available resources.

SUMMARY OF THE INVENTION

In one application, a transmission of a marker in a time slot over one channel indicates a request by the corresponding field unit to go active. That is, transmission of a marker in an assigned time slot indicates that the field unit is requesting that reverse link traffic channels be assigned to the user for transmitting a data payload from the field unit to the base station. This presumes that the field unit is presently in the standby mode. Alternatively, a field unit transmits a marker over a second channel of the pair of reverse link channels to indicate that the field unit is not requesting to be placed in the active mode. For example, the field unit does not want to transmit data on a reverse link channel. Rather, the field unit requests to remain inactive but synchronized with the base station so that the field unit can immediately go active again at any moment.

In either case, a wireless communications system employing the principles of the present invention may improve performance of detecting the markers by having the field units transmit the markers at different power levels (e.g., 9 dB for one marker and 11 dB for the other marker), which can improve system performance. The difference in power levels of the markers allows the base station to identify the request markers using alternative criteria with a low probability of error, where the alternative criteria may include comparing the markers to respective energy level thresholds, monitoring occupancy of time slots, occupancy of mutually exclusive code channels, or combinations thereof. For example, in one particular embodiment, a request marker, which is generally a high priority marker, is transmitted with higher power, which improves the probability of detection and reduces the probability of false detection of the request marker.

In one particular CDMA system application, the field unit provides a Heartbeat (HB) channel using a first code in a reverse link to the base station and a heartbeat-with-request (HB/RQST) channel using a second code in the reverse link. In this CDMA application, according to the principles of the present invention, the field unit may transmit the HB and HB/RQST channels with a difference in power levels, preferably giving the HB/RQST the higher power since it is a higher priority signal.

The teachings of the present invention support I-CDMA and 1×EV-DV systems, but are general enough to support systems employing various other communications protocols used in wired or wireless communications systems. Code Division Multiple Access (CDMA) systems, such as IS-2000, and Orthogonal Frequency Division Multiplexing (OFDM) systems, such as IEEE 802.11a wireless local area network (LAN), may employ an embodiment of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
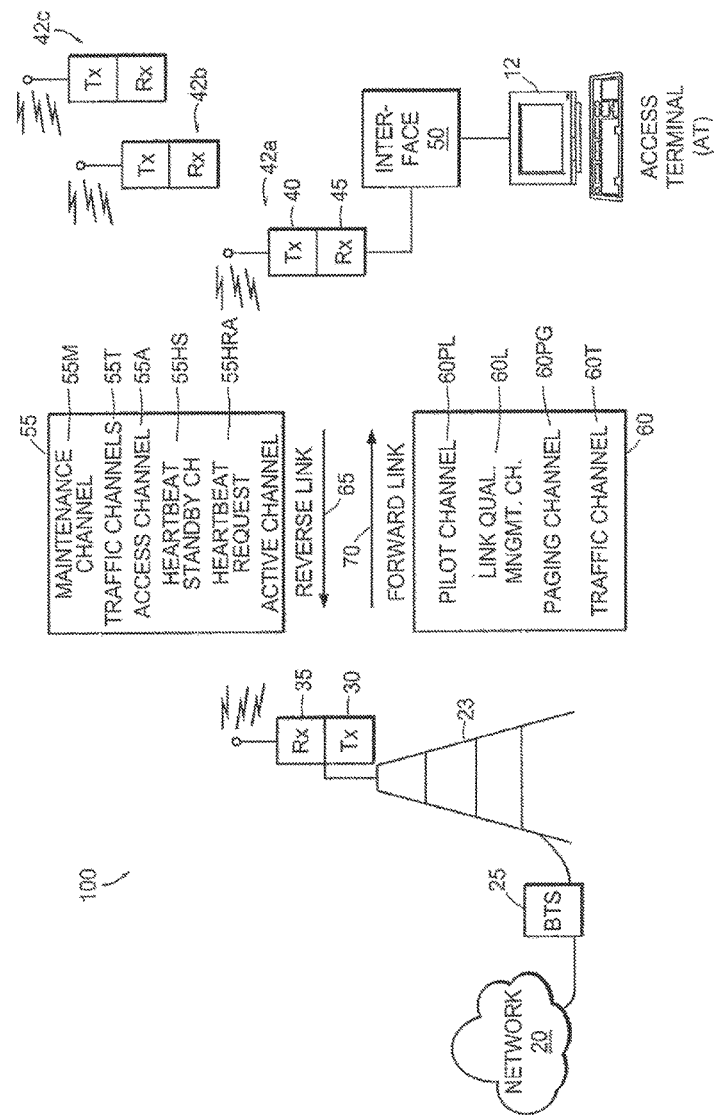
FIG. 1 is a schematic diagram of a communications system in which in an embodiment of the present invention may be deployed.

A description of the preferred embodiments of the invention follows.

In a wireless communications system, an embodiment of the present invention applies to the power that is transmitted from a handset (or the target received power at a base terminal station (BTS>> for a Heartbeat signal (HB) versus a Heartbeat-with-Request signal (HBR, HB/RQST, or just the "request" signal). The HB and HB/RQST signals may be transmitted on a maintenance channel, which, as disclosed in U.S. Ser. No. 09/775,305, is a single code channel (out of many) on a reverse link of a CDMA communications system. The maintenance channel is time slotted and different users are assigned different slots.

A field unit in that wireless communications system sends a heartbeat signal to maintain timing and/or power control as well as an indication of presence to the BTS. When a terminal needs an assigned reverse link channel, the terminal then transmits at least one request signal. The signal(s) may be modulated messages or simply coded pilot signals with no "bits".

The requirements for probability of detection and probability of false detection for these channels are quite different. For instance, the detection requirement for BB is relatively low. It may only need to be detected at a rate that is fast enough to track the slew of the timing of the code channel due to physical movement of multi-path structure change resulting from Doppler in the channel. The power control in this case continues to work independent of detection or lack of detection.

For instance, if the signal is not "detected" because the received power is not above a predetermined threshold but the correlation is aligned, the power command indicates that the power was too low and that the terminal should "power up". One requirement, in this particular embodiment, is that the detection occur often enough to allow the detector to be aligned in time to the received signal.

On the other hand, the probability of detection for the request signal is preferably very high as a request signal is considered a high priority signal since a request is an urgent event. Therefore, the request signal may be sent with higher power, and the threshold at the BTS may be set differently. This results in a better probability of detection as well as a low probability of false detection.

Thus, according to the principles of the present invention, a different probability of detection and probability of false detection for the heartbeat signal, request signal, or any other signaled message can be employed.

Based on the signal type, an access terminal can transmit the signals with different powers. Various criteria can be used by the BTS for detecting indications of a request sent on the signals. For example, in time slotted channels or mutually exclusive code channels, some slots are occupied when a request is being made versus when a request is not being made. In such a case, either a higher power, presence, or both may be used as detection criteria.

FIG. 1 is a diagram of an example communications system 100, similar to the system described above, employing an embodiment of the present invention. A base station 25 with antenna tower 23 maintains wireless communications links with each of a plurality of field units 42a, 42b, 42c (collectively, field units 42) as shown. Such wireless links are established based upon assignment of resources on a forward link 70 and a reverse link 65 between the base station 25 and field units 42. Each link 65 or 70 is typically made up of several logical reverse link channels 55 and several logical forward link channels 60, respectively.

As shown, the communications system 100 supports wireless communications between an interface 50 and a network 20. Typically, the network 20 is a Public Switched Telephone Network (PSTN) or computer network, such as the Internet, internet, or intranet. The interface 50 is preferably coupled to a digital processing device, such as a portable computer 12, sometimes referred to as an access unit, to provide wireless access to the network 20. Consequently, the portable computer 12 has access to the network 20 based on communications over a combination of both hard-wired and wireless data links.

In a preferred embodiment, the forward link channels 60 and reverse link channels 55 are defined in the communications system 100 as Code Division Multiple Access (CDMA) channels. That is, each CDMA channel is preferably defined by encoding and transmitting data over the channel with an augmented pseudo random noise (PN) code sequence. The PN coded data is then modulated onto a radio frequency carrier. This enables a receiver to decipher one CDMA channel from another knowing only the particular augmented PN code assigned for a given channel. In accordance with an embodiment, each channel may occupy a 1.25 MHZ band consistent with the IS-95 CDMA standard and 1xEV-DV standard and is capable of transmitting at 38.4 kbps.

A forward link 70 includes at least four logical forward link channels 60. As shown, this includes a Pilot Channel 60PL, Link Quality Management (LQM) channel 60L, paging channel 60PG, and multiple traffic channels 60T.

A reverse link 65 includes at least five logical reverse link channels 55. As shown, this includes a heartbeat standby channel 55HS, heartbeat request active channel 55HRA, access channel 55A and multiple traffic channels 55T. Generally, the reverse link channels 55 are similar to the forward link channels 60 except that each reverse link traffic channel 60T can support variable data rates from 2.4 kbps to a maximum of 160 kbps.

Data transmitted between the base station 25 and field unit 42a typically consist of encoded digital information, such as web page data. Based on the allocation of multiple traffic channels in the reverse link 65 or forward link 70, higher data transfer rates can be achieved in a particular link between the base station 25 and field unit 42a. However, since multiple field units 42 compete for bandwidth allocation, a field unit 42a may have to wait until resources are free to be assigned traffic channels to transmit a data payload.

Before discussing an example detector system (FIG. 2) that can be used to distinguish a heartbeat from a heartbeat-with-request signal, a brief discussion of example signals will be discussed in reference to FIGS. 3A-3C.

Figure 3A:
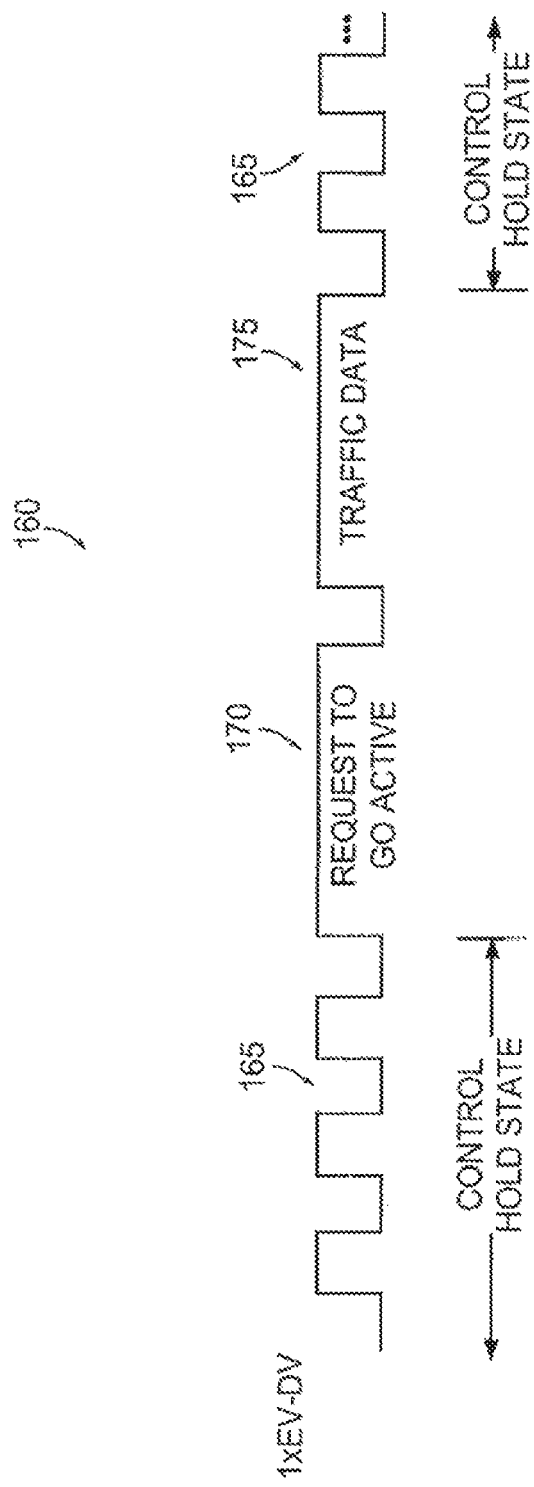
FIG. 3A is a signal diagram of a 1×EV-DV signal with a first marker indicating 'control hold' and a second marker indicating a 'request to go active'.

In FIG. 3A, a 1xEV-DV signal 160 that may be transmitted by the field unit is shown having three distinct states: a 'control hold' state 165, a 'request to go active' state 170, and a data traffic state 175. In the 'control hold' state 165, the signal 160 does not include a 'request to go active' indication. In other words, the signal 160 remains in an 'idle' or 'control hold' state, which indicates that the field unit 42a is not requesting traffic channels. The 'request to go active' state 170 is an indication that the field unit is requesting to transmit data on a traffic channel over a reverse link to the BTS 25. In the traffic state 175, traffic data is transmitted by the field unit to the BTS. Following transmission of the traffic data over the reverse link, the signal 160 reverts back to the 'control hold' state 165 following a transmission of a 'data transmission complete' state (not shown).

Although shown as a single signal 160, it should be understood that the signal may be multiple signals, optionally coded with orthogonal or non-orthogonal codes into mutually exclusive channels. For example, the 'control hold' state 165 may be transmitted on a different channel from the 'request to go active' state 170. Similarly, the traffic data transmitted in a traffic state 175 may be on a separate channel from the other two states 165, 170. An example of multiple channel is discussed in reference to FIGS. 3B and 3C.

Figure 3B:
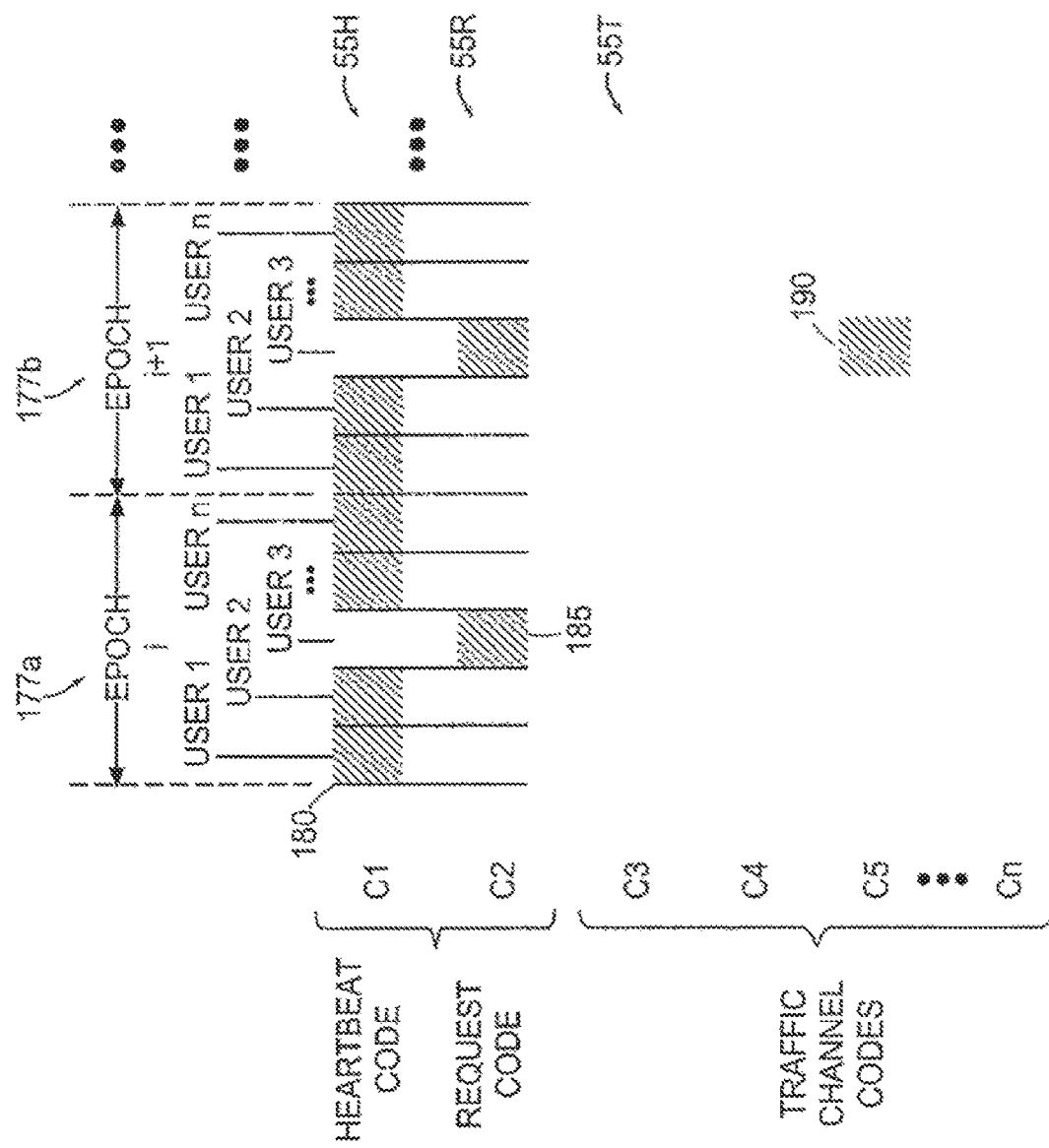
FIG. 3B is a signal diagram of a code division multiple access (CDMA) set of code channels having a marker in an assigned time slot that indicates that the field unit is requesting a change in communications states.

FIG. 3B is an example of an Internet code division multiple access (I-CDMA) signaling diagram that has assigned time slots for users 1, 2, 3, . . . , N repeating in epoch i 177*a*, epoch i+1 177*b*, and so forth. The channels are composed of the heartbeat channel 55H, request channel 55R, and traffic channels 55T. Each of these channels has an associated code C1, C2, C3, C4, . . . "CN, which allow signals to be transmitted on mutually exclusive code channels. Both the transmitting and receiving systems process the information in the channels by using the codes to separate the information respectively included therein in a typical CDMA manner.

In the example shown, users 1, 2, 4, 5, 6, . . . , N are requesting to remain in an idle state, indicated by the presence of a signal 180 in the heartbeat channel 55H. User 3, however, is requesting to transmit data over a reverse link based on a signal 185 in the request channel 55R in the first epoch 177*a*. In the second epoch 177*b*, user 3 begins to transmit traffic data 190 in an associated traffic channel using code C5.

Figure 3C:
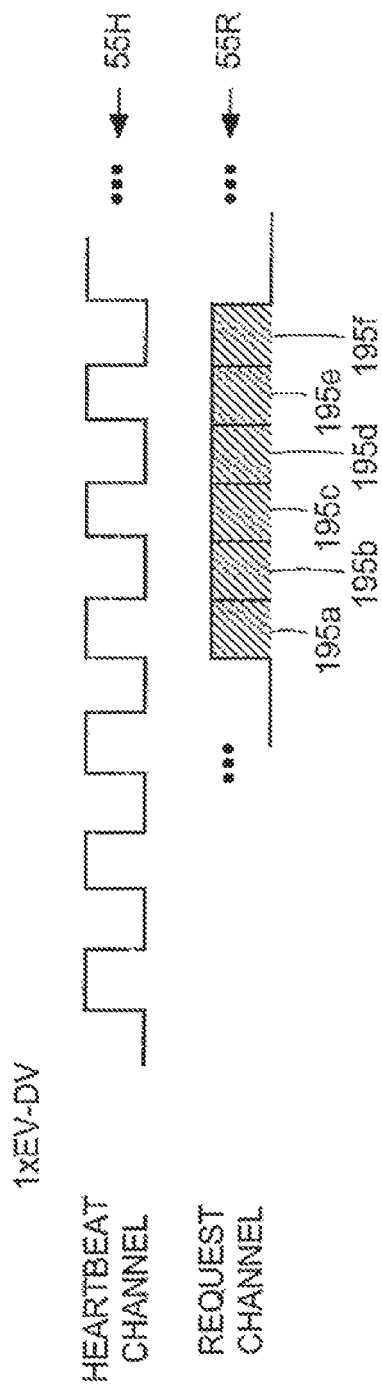
FIG. 3C is a signal diagram of an alternative embodiment of a reverse link signal having the indications.

FIG. 3C is a more detailed signal diagram of the 1×EV-DV signal of FIG. 3A that is used to indicate a 'request to go active' to the base station 25 from the field unit 42*a*. In this embodiment, the 1×EV-DV signal is composed of multiple signals on different logical channels: a heartbeat channel 55H and a request channel 55R. The heartbeat channel 55H provides continuous timing and other information (e.g., power level, synchronization, etc.) from the field unit 42*a* to the base station 25. The field unit 42*a* uses the request channel 55R to make a request (e.g., digital "1") of the base station 25 to request a traffic channel on the reverse link 65 for transmitting data.

Sampling time periods 195*a*, 195*b*, . . . , 195*f* (collectively 195) denoted by arrows indicate times or intervals at which the BTS 25 samples the time slots of the request signal 55R and, optionally, the heartbeat channel 55H to determine whether a request for a traffic channel is being made. It should be understood that the sampling may occur over the entire time slot or a subset thereof. Also, the heartbeat channel 55H and request channel 55R use mutually exclusive codes, in this particular embodiment, so the sampling is performed on their mutually exclusive code channels 55H, 55R in all or a subset of time slots. In one particular embodiment, the base station 25 samples mutually exclusive code channels 55H, 55R in time slots designated for request indications, such as in time slots at sampling times 195*b*, 195*d*, and 195*f*. During these time slots, the heartbeat channel 55H is "inactive," but the request channel 55R is "active".

As discussed above, the signals in the "active" request time slots may be modulated messages or simply coded pilot signals with no "bits". Thus, detection may be based solely on the respective energy levels of the heartbeat and heartbeat-with-request signals in respective time slots over a given time interval or spanning several time intervals. In one particular embodiment, the 'control hold' state 165 indication has a first energy level, and the 'request to go active' state 170 has a second energy level.

In this particular embodiment, distinguishing the two states may be a matter of measuring energy levels of the signals(s) and (i) comparing the energy levels against at least one threshold or (ii) determining that a request is present, optionally in a mutually exclusive code channel in time slots when the heartbeat signal is at a logical zero. The different energy levels of the indications may be provided by the duty cycle of the signals, frequency of the signals, power of the signals, signaling structure, and so forth.

Figure 4:
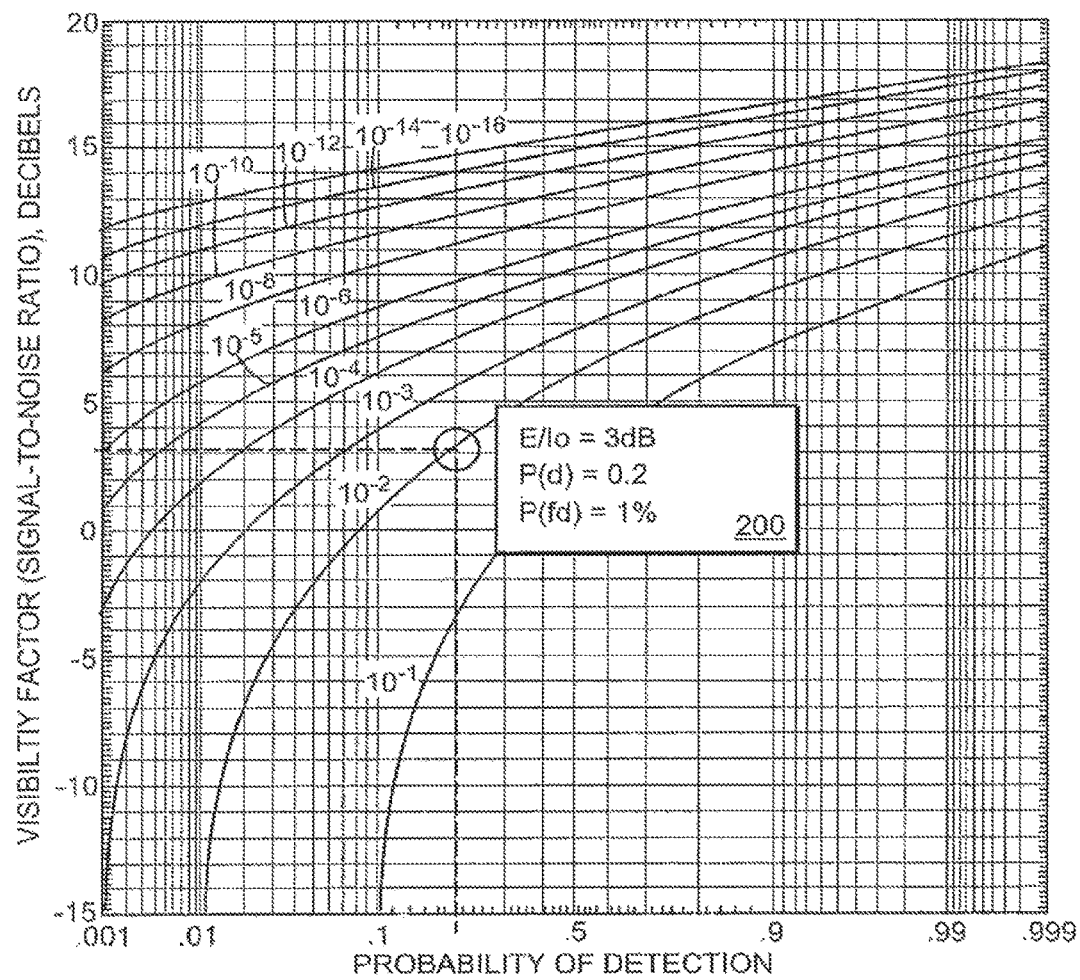
FIG. 4 is a plot of signal-to-noise ratio versus probability of detection that may be used in determining energy levels of the indications in the signals of FIGS. 3A-3C.

To understand how the energy levels of the signals can be used to improve system performance, one can refer to FIG. 4, which provides a chart for selecting signaling requirements based on the following parameters or factors: (i) probability of detection, P(d)(x-axis), (ii) signal-to-noise ratio in decibels (y-axis), and (iii) probability of false detection, P(fd) (curves in the chart). This chart shows a required signal-to-noise ratio at the input terminals of a linear-rectifier detector as a function of probability of detection for a single pulse, with the false-alarm probability P(fd) as a parameter, calculated for a non-fluctuating signal. It should be understood that alternative parameters or factors may be used to establish or define the transmitted power levels of the indications.

At the circled point 200, the signal-to-noise ratio is 3 dB, P(d)=20%, and P(fd)=1%. To increase the probability of detection for the same probability of false detection, one simply needs to slide the circled point 200 upward along the same probability of false detection curve, which suggests that an increase in the signal-to-noise ratio is used to improve system performance and, thus, improving the likelihood that the request signal will be detected quickly.

Before providing an example model and discussion regarding example Heartbeat standby 55HS and Heartbeat Request Active 55HRA energy levels for the example communications system 100 (FIG. 1), a brief discussion of a processor and detector that may be used in the system is now provided.

Figure 2:
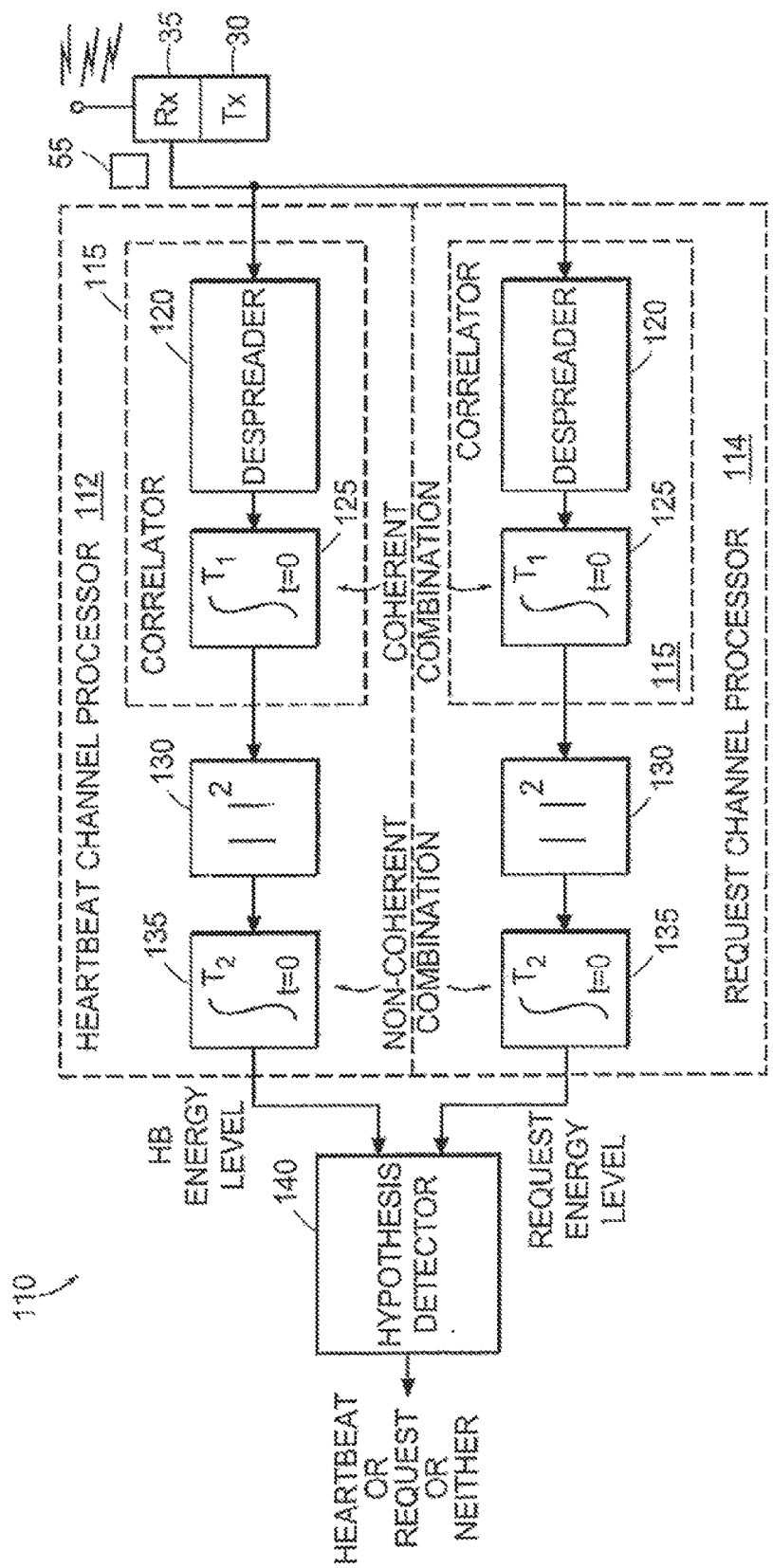
FIG. 2 is a schematic diagram of a subsystem employed by a base station in the communications system of FIG. 1 used to determine whether a reverse link signal includes an indication for a request to change communications states based on an energy level in the signal.

FIG. 2 is a schematic diagram of a request detection processor 110 used to determine whether the field unit 42*a* has requested to send data to the BTS 25. The receiver Rx 35 receives signals 55, which includes the maintenance channel 55N, traffic channels 55T, access channel 55A, heartbeat standby channel 55HS, and heartbeat request active channel 55HRA. The reverse link channels 55 are processed such that a heartbeat channel processor 112 receives the heartbeat standby channel 55HS and a request channel processor 114 receives the Heartbeat Request Active channel 55HRA.

The heartbeat channel processor 112 and request channel processor 114 include the same processing elements, in this particular embodiment, so a discussion of just the heartbeat channel processor 112 will be provided for brevity.

The heartbeat channel processor 112 receives the heartbeat standby channel 55HS. A correlator 115 uses a despreader 120 to despread the heartbeat standby channel 55HS. An integrator 125 is used to coherently combine the heartbeat signal. By coherently combining the signal, an integration of I, Q and its phase causes the phase of the signal to be removed and output the power of the signal.

Following the correlator 115, a rectifier 130 (i.e., absolute value of the signal squared) rectifies the power of the signal, which is then integrated by a second integrator 135 to calculate the energy of the received heartbeat signal. The second integrator 135 provides non-coherent combination of the signal, which is calculated over short time intervals. The non-coherent integration provides just magnitudes if the terminal is moving too fast, thus causing a cross-over of the 1S0-degree phase point, which can cause ambiguities in determining the energy of the signal in the absence of the non-coherent combination.

The output from the heartbeat channel processor 112 is a heartbeat energy level, and the output from the request channel processor 114 is a request energy level. Each of these energy levels, in this particular embodiment, is fed to a hypothesis detector 140, which determines whether a heartbeat signal, request signal, or neither signal is in the reverse link channels 55 received by the base station 25.

To determine which signal(s) is/are present, the hypothesis detector 140 includes logical functions. For example, in this particular embodiment, the hypothesis detector 140 compares a first energy level threshold against the first energy level (i.e., heartbeat energy level) and compares a second energy level threshold against the second energy level (i.e., request energy level).

An example energy level threshold to compare the heartbeat energy level against is 9 dB and the request energy level threshold is 11 dB. The energy level thresholds may be dynamically selected, predetermined, or applied in another manner, such as based on a transmitted power level, which may be reported by the field unit to the base station over the heartbeat channel 55H, for instance. In the case of the energy level calculation and comparison, the first and second energy levels may be dependent on occupancy of time slots in the signaling channel(s) used by the signal 55, so the energy level thresholds can be based on an expected or specified number of "1" bits used to indicate a 'request to go active' or to indicate a request to remain in idle mode.

The output of the hypothesis detector 140 may be used to change the state of the communications system. For example, if the hypothesis detector 140 determines that a 'request to go active' (i.e., send a data transmission on the reverse link) is being made by the field unit, then the hypothesis detector outputs a signal to a processor (not shown in the BTS 25) that is responsible for providing the portable computer 12 with a traffic channel 55T. In one embodiment, the BTS 25 allocates the traffic channel 55T if the detected energy level of the signal is determined to be above the second energy level threshold. Alternatively, the BTS allocates the traffic channel 55T if the hypothesis detector 140 determines that the detected energy level is below the second energy level threshold.

As described in reference to FIG. 3C, the heartbeat channel processor 112, request channel processor 114, and hypothesis detector 140 may be configured or designed in a manner that monitors an occupancy of time slots used to indicate the request to change communications states. In one embodiment, the detecting includes monitoring occupancy of mutually exclusive code channels, such as shown in FIGS. 3B and 3C.

A feedback loop (not shown) may be employed to cause the heartbeat channel processor 112 and request channel processor 114 to be "adaptive". For example, based on the received energy level of the heartbeat channel 55H, the integration time of the integrators 125, 135 may be adjusted, and the energy level thresholds used by the hypothesis detector 140 for comparison of the energy levels of the heartbeat and request signals may also be adjusted by the feedback loop. Such a feedback loop may use a command or message to transfer information between the BTS and field unit that includes information regarding the power levels of the heartbeat or heartbeat-with-request signals transmitted by the field unit.

As discussed above, the first communications state may be a standby communications state and the second communications state may be a payload communications state. In other systems or even the same system, the communications states may refer to other communications states, such as a request to change base stations, power control signaling, and so forth. The use of different energy levels in signaling as described herein is applicable to wireless, wired, or optical communications systems. In either case, the communications states may be used in voice or data communications systems.

As also discussed above, the second energy level may be based on a target probability of detection, false detection, or combination of both as discussed in reference to FIG. 4. In other words, the field unit may transmit the request signal at a given power level or a given number of pulses per given time period to achieve a corresponding signal-to-noise ratio for a given target probability of detection, false detection, or both as discussed in reference to FIG. 4.

An analysis may be used to set the transmission power or number of transmitted indications, or a feedback mechanism may be employed in the communications system for causing the field unit to change its behavior so as to have the received energy levels of the indications achieve a predetermined signal-to-noise ratio, thus providing the desired probability of detection and false detection parameters.

Simulation:

A simulation is now presented that discusses the trades effecting the probabilities of detection and false detection for the heartbeat (HB) and heartbeat-with-request (HB/RQST) channels. Recommended SNR targets for HB and HB/RQST channels are provided. Further, an analytical calculation is made to determine a recommended target E/Io for an acceptable probability of detection and probability of false detection.

To allow readers to baseline the simulation relative to IS-2000 power control, the reader should be aware that the simulation employs the following parameters:

800 Hz closed loop power control;

SNR of the i'th user is calculated as $SNR(i)=P(i)-P\_interference+processing\ Gain+Er$, where $P\_interference(i)$ is a total received interference for the i'th user and calculated as $P\ interference(i)=20*\log 10(10)^\wedge \Sigma_{j\neq i}(10^\wedge P(j/20)+10^\wedge (P_{TH}/20))$, where P(i) is the power received from the i'th user and PTH is thermal noise floor and is arbitrarily set to 120 dBm;

processing gain is 10 log 64;

fading model is Jakes;

Er=a Normal distributed random variable with 1 sigma=0.67 dB error in SNR estimation at the BTS; and power control bit (PCB) errors=3%.

In this particular simulation, a choice of a target SNR for the HB channel was chosen first. Based on a 9 dB E/Io, where E is the entire energy in the heartbeat message and a 95% probability of detection with a 0.1% false detection rate in Additive White Gaussian Noise (AWG) is achieved (see Viterbi, A., CDMA: *Principles of Spread Spectrum Communication*, Addison Wesley, 1995, p 113.)

Increasing the probability of detection to 99% yields significantly higher false detection rate of 1% in AWGN. This false detection rate is of interest as it should be low enough that non-detection will occur for a relatively long duration when the terminal has dropped the communications link with the base station.

Typically, the duration is defined by a timer having a duration of 500 ms to 2 sec or 25 to 100 sequential non-detections. For reference, in a single path fading environment with 9 db E/Io, a 90% detection probability and a 1% false detection rate is predicted by theory. For this case, the details associated with the detection probability in the fading environment are considered in the following discussion.

Detection of the heartbeat signal with 50 Hz power control versus field unit velocity is now considered. The simulation is based on a full rate model in which modifications were made such that the power control (PC) rate is 50 Hz and standby terminals are time slotted, non-overlapping.

While the speed of the terminal is irrelevant above about 2 mph, closed-loop power control is seen as useful in allowing the fading to vary around the mean path loss. It is noted that the results are relatively insensitive to a Power Control Bit (PCB) error rate up to about 40%. Beyond that, the system performed poorly, demonstrating that some form of closed-loop control is needed to maintain the mean path loss. It is therefore useful that some form of closed-loop power control be performed to bring the transmitter (Tx) power of the field unit to the average appropriate for the field unit to achieve the mean path loss to the base station.

Simulation using the above parameters shows that if the base station detects the 'request to go active' indication 2 dB below the target SNR (as defined above), then the average time of detection is about 16 ms, with standard deviation at about 14 ms. From the simulation, to achieve a low latency in HB/RQST detection, the following equation has been determined:

$$\text{Target\_SNR(RQST)} = \text{Target\_SNR(HB)} + 2 \text{ dB} \quad (1)$$

Based on the required detecting/false detection rates m AWGN, a Target_SNR of 9 dB for the Heartbeat message and 11 dB for the heartbeat-with-request (HB/RQST) message were chosen. These parameters yield a 15 ms detection latency on average at 20 mph with low probability of false detection.

In terms of false assignment probability, while the false detection rate is not explicitly calculated in the simulation, a pessimistic bound is given as follows:

$$Pfd(RQST) = (1 - Pd(HB)) * Pfd(HB) = 5\% * 0.1\% = 5 \, E-5, \quad (2)$$

where Pfd is the probability of false detection and Pd is the probability of detection.

The above equation and result is a product of two conditions: (i) not detecting the existence of a BB while it is present and (ii) falsely detecting a BB when it is not present. This is a pessimistic bound since the additional 2 dB of transmitted power for HB/RQST versus HB is not included in the analysis.

At a HB rate of 50 Hz, this would yield a false assignment for one standby user every 400 seconds on average. For N heartbeat users, the probability is linear since the events are independent. Therefore, for a fully loaded standby user population of 96 for a particular base station, the average false assignment rate is expected to be roughly one every four seconds.

A condition of a false assignment can be recovered from relatively quickly as the false assignment can be detected quickly. When a false assignment occurs, three conditions are typically present. First, no traffic shows up on the assigned reverse channel. Second, the heartbeat-with-request signal is not present. If a missed channel assignment has occurred, the HB/RQST continues to be present. Third, the heartbeat message will likely be present. The probability of not detecting this condition in one frame is Pfd(RQST)=5E-3%. This should be detected within one or two frames before the channel can be re-assigned to a legitimate user. If it is assumed that detection takes two frames, the reverse capacity would be reduced by no more than 1% and is likely less as the probability of false detection for the HB/RQST is targeted at 11 dB E/Io.

For a signal with no offset between the Target_SNR and the detection threshold, the delay to detection is 35 ms on the average between the simulation with a remote subscriber unit moving at 1 mph and at 20 mph. For the heartbeat-with-request (HB/RQST) signal, the average delay to detection is less than 20 ms, with a detection threshold of 2 dB below the target SNR of 11 dB. This is possible since the transmit (Tx) power is increased by 2 dB for the HB/RQST relative to the HB signal.

The simulation shows that the minimum average, given 96 users in a 20 ms power control (PC) period is close to 10 ms. The delay is expected to be better than 75 ms 99% of the time.

The simulation also shows that the addition of 2 dB of additional transmit power for the HB/RQST message increases the detection probability and reduces the detection latency to 15 ms on average. An estimate of the co-channel total interference of a fully loaded maintenance channel is between 6 dB less than an IS-2000 fundamental channel (9600 bps Reverse Traffic Channel (R-TCH), 9600 bps Reverse Dedicated Control Channel (R-DCCH>>.

While this invention has been particularly shown and described with references to preferred embodiments thereof, it will be understood by those skilled in the art that various changes in form and details may be made therein without departing from the scope of the invention encompassed by the appended claims.

What is claimed is:

1. Wireless communication processing elements operable within a field unit of a wireless communications system, the wireless communication processing elements comprising:
   a heartbeat channel processor;
   a request channel processor;
   a transmitter; and
   a receiver;
   wherein the transmitter is configured to transmit a first signal having one of a plurality of formats in which at least two of the formats have a different power offset;
   wherein the heartbeat channel processor causes the transmitter to transmit a heartbeat signal via the first signal in response to the field unit not having an allocation of traffic data resources, the heartbeat signal to maintain timing and power control and provide an indication of presence within the wireless communications system;
   wherein the request channel processor is configured to cause the transmitter to transmit the heartbeat signal in a format from among the at least two formats associated with a request on a condition that the field unit requires an allocation of traffic data resources; and
   wherein the receiver is to, in response to the request, receive an allocation of traffic data resources for the field unit; and
   wherein the receiver is to further cause the transmitter to transmit reverse link data in response to the allocation in a time interval including at least one time slot.

2. The wireless communication processing elements of claim 1, wherein the heartbeat channel processor and the request channel processor are both part of the same wireless communication processing elements of the field unit.

3. The wireless communication processing elements of claim 1:
   wherein the receiver is further configured to receive power commands and adjust a transmission power level of the first signal in response to the power commands.

4. The wireless communication processing elements of claim 1:
   wherein the request channel processor to cause the transmitter to transmit the heartbeat signal in a format from among the at least two formats associated with a request comprises the request channel processor causing the transmitter to transmit a heartbeat-with-request-signal from the field unit via a first one of the at least two formats having different power offsets.

5. The wireless communication processing elements of claim 1:
wherein the plurality of formats include the first of the at least two formats having a first power level corresponding to a heart beat signal without a request and a second of the at least two formats having a second power level corresponding to a heartbeat-with-request-signal, the second power level being different than the first power level.

6. The wireless communication processing elements of claim 1:
wherein the heartbeat channel processor and request channel processor further implement a feedback loop;
wherein the feedback loop uses a command or message to transfer information from the wireless communication system to the field unit; and
wherein the receiver is to receive the command or message from the wireless communication system adjusting energy levels utilized for the heartbeat and request signals.

7. The wireless communication processing elements of claim 1, wherein the power offsets are in fixed dB values.

8. The wireless communication processing elements of claim 1, wherein the first signal with the format associated with the request is derived from at least an orthogonal code.

9. The wireless communication processing elements of claim 1, wherein the first signal with the format associated with the request comprises one of a modulated message or a coded pilot signal with no bits and without use of a modulated bit.

10. The wireless communication processing elements of claim 1, wherein the transmitter is configured to transmit the first signal comprises the transmitter begin configured to only transmit the first signal on the a condition that timing for the reverse link data is maintained within the wireless communications system.

11. The wireless communication processing elements of claim 1, wherein the at least two formats having different power offsets include at least a control hold state indication signal having a first energy level and a request to go active state indication signal having a second energy level different than the first energy level.

12. The wireless communication processing elements of claim 1, wherein the wireless communication processing elements utilize a difference in power levels in support of the request, wherein the request comprises a request to go active by the wireless communication processing elements on behalf of the field unit.

13. The wireless communication processing elements of claim 12, wherein the request to go active by the wireless communication processing elements utilize both the difference in power levels and a repetition of the pulses to indicate the request to go active.

14. The wireless communication processing elements of claim 1, wherein the wireless communication system is to differentiate between a control hold state indication signal and a request to go active signal transmitted by the wireless communication processing elements on behalf of the field unit by:
(i) measuring energy levels of the control hold state indication signal and the request to go active signal; and
(ii) comparing the energy levels against at least one threshold.

15. The wireless communication processing elements of claim 14, wherein the different energy levels of the control hold state indication signal and the request to go active signal operate as one or more of a duty cycle of the signals, a frequency of the signals, a power of the signals, or a signaling structure for the signals.

16. The wireless communication processing elements of claim 1, wherein the wireless communication system is to determine the request to go active signal transmitted by the wireless communication processing elements on behalf of the field unit is present within a mutually exclusive code channel in a time slot when the heartbeat signal is at a logical zero.

17. A wireless communications system comprising:
a plurality of field units;
a base station to wirelessly communicate with each of the plurality of field units; and
wherein each of the plurality of field units have embedded therein wireless communication processing elements comprising at least:
(i) a heartbeat channel processor,
(ii) a request channel processor,
(iii) a transmitter, and
(iv) a receiver,
wherein the transmitter of each field unit is configured to transmit a first signal having one of a plurality of formats in which at least two of the formats have a different power offset;
wherein the heartbeat channel processor of each field unit causes the transmitter to transmit a heartbeat signal via the first signal in response to the respective field unit not having an allocation of traffic data resources, the heartbeat signal to maintain timing and power control and provide an indication of presence for the respective field unit within the wireless communications system;
wherein the request channel processor of each field unit is configured to cause the transmitter of the respective field unit to transmit the heartbeat signal in a format from among the at least two formats associated with a request on a condition that the respective field unit requires an allocation of traffic data resources; and
wherein the receiver of each field unit is to, in response to the request, receive an allocation of traffic data resources for the respective field unit; and
wherein the receiver of each field unit is to further cause the transmitter of the respective field unit to transmit reverse link data in response to the allocation in a time interval including at least one time slot.

18. The wireless system of claim 17:
wherein the plurality of formats include the first of the at least two formats having a first power level corresponding to a heart beat signal without a request and a second of the at least two formats having a second power level corresponding to a heartbeat-with-request-signal, the second power level being different than the first power level.

* * * * *